(12) United States Patent
Fukui (10) Patent No.: US 9,638,389 B2
(45) Date of Patent: May 2, 2017

(54) WATERPROOF STRUCTURE FOR VEHICLE LIGHTING DEVICE

(71) Applicant: TOYODA GOSEI CO., LTD., Kiyosu-shi, Aichi-ken (JP)

(72) Inventor: Hirotaka Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 135 days.

(21) Appl. No.: 14/633,318

(22) Filed: Feb. 27, 2015

(65) Prior Publication Data
US 2015/0369444 A1  Dec. 24, 2015

(30) Foreign Application Priority Data

Jun. 19, 2014 (JP) .................................. 2014-126324

(51) Int. Cl.
*B60Q 1/18* (2006.01)
*F21S 8/10* (2006.01)
*F21V 8/00* (2006.01)

(52) U.S. Cl.
CPC ........... *F21S 48/33* (2013.01); *F21S 48/2206* (2013.01); *F21S 48/2212* (2013.01); *F21S 48/2237* (2013.01); *F21S 48/2268* (2013.01); *G02B 6/0088* (2013.01)

(58) Field of Classification Search
CPC .... F21S 48/2237; F21S 48/1241; F21S 48/33; F21S 48/335
USPC ........................................................ 362/511
See application file for complete search history.

(56) References Cited

U.S. PATENT DOCUMENTS

| | | | | |
|---|---|---|---|---|
| 6,594,417 | B1* | 7/2003 | Hulse ..................... | B60Q 3/004 362/487 |
| 2004/0179358 | A1* | 9/2004 | Tufte ....................... | B60Q 1/32 362/223 |
| 2004/0184276 | A1* | 9/2004 | Moll ........................ | B60Q 1/32 362/487 |
| 2005/0254253 | A1* | 11/2005 | Yeh ...................... | B60Q 1/0041 362/514 |
| 2005/0270794 | A1* | 12/2005 | Okamoto ............... | F21S 48/211 362/555 |
| 2007/0223218 | A1* | 9/2007 | You ........................ | F21S 8/031 362/231 |

(Continued)

FOREIGN PATENT DOCUMENTS

JP   7-30412 U   6/1995
JP   3286162 B2  3/2002

*Primary Examiner* — Jong-Suk (James) Lee
*Assistant Examiner* — Eric T Eide
(74) *Attorney, Agent, or Firm* — Posz Law Group, PLC (57) ABSTRACT

A vehicle lighting device includes a case, a lens, a light guide, a waterproof member, hooks, and catches. The catches are elastically deformed outward to separate from an accommodation portion so that the hooks enter the catches from the side closer to the accommodation portion. Engaging surfaces of the hooks engage with catch surfaces of the catches so that the case and the lens are joined. The joining causes the waterproof member to be compressed. The engaging surfaces and the catch surfaces are inclined by an equal angle relative to an imaginary plane perpendicular to the arrangement direction of the case and the lens such that the catch surfaces are located inward of the engaging surfaces and close to the accommodation portion.

3 Claims, 8 Drawing Sheets (56) References Cited

U.S. PATENT DOCUMENTS

| | | | |
|---|---|---|---|
| 2009/0080201 A1* | 3/2009 | Wu | F21V 15/01 |
| | | | 362/362 |
| 2011/0016836 A1* | 1/2011 | Yano | B60R 16/0239 |
| | | | 55/491 |
| 2011/0194292 A1* | 8/2011 | Tsai | F21V 17/164 |
| | | | 362/311.02 |
| 2011/0280020 A1* | 11/2011 | Chen | F21V 5/007 |
| | | | 362/294 |
| 2014/0218951 A1* | 8/2014 | Takada | F21S 48/1291 |
| | | | 362/511 |

* cited by examiner

WATERPROOF STRUCTURE FOR VEHICLE LIGHTING DEVICE

BACKGROUND OF THE INVENTION

The present invention relates to a waterproof structure that is applied to a vehicle lighting device having a shell formed by a case and a lens and that prevents water from entering an accommodation portion surrounded by the case and the lens.

Vehicle lighting devices mounted on the exterior of a vehicle for use have been proposed that have a shell formed by a case and a lens and include a light emitter arranged in an accommodation portion surrounded by the case and the lens. The vehicle lighting devices include a waterproof member arranged between the case and the lens and on the outer side of the accommodation portion to prevent water from entering the accommodation portion. The case and the lens are joined by joining portions.

The joining portions are formed by combinations of, for example, hooks located on one of the case and the lens and outward of the waterproof member and catches located on the other one of the case and the lens and outward of the waterproof member. When the case and the lens are joined together, either the hooks or the catches are elastically deformed outward so that the hooks enter the catches from the side closer to the accommodation portion, and an engaging surface of each hook is engaged with a catch surface of the associated catch.

The waterproof structures in which the case and the lens that sandwich the waterproof member are joined by engaging the hooks with the catches as described above have been disclosed in, for example, Japanese Patent No. 3286162 and Japanese Laid-Open Utility Model Publication No. 7-30412.

When an elastic waterproof member is used and the waterproof member is compressed by the joining operation, a reactive force acts on the case and the lens. Thus, depending on the shape or the engaging state of the hooks and the catches, either the hooks or the catches are elastically deformed outward and act to slide along the engaging surfaces and the catch surfaces in a disengaging direction. If an external force is applied to the vehicle lighting device during usage or if thermal expansion or warpage occurs under such a circumstance, the hooks may possibly escape from the catches.

SUMMARY OF THE INVENTION

Accordingly, it is an objective of the present invention to provide a waterproof structure for a vehicle lighting device that is capable of preventing hooks from escaping from catches.

To achieve the foregoing objective and in accordance with one aspect of the present invention, a waterproof structure for a vehicle lighting device is provided. The waterproof structure includes a case and a lens forming a shell, an accommodation portion surrounded by the case and the lens, a light emitter arranged in the accommodation portion, an elastic waterproof member located between the case and the lens and at a position outward of and separate from the accommodation portion, a hook that is provided on one of the case and the lens and located outward of the waterproof member, and a catch that is provided on the other one of the case and the lens and located outward of the waterproof member. One of the hook and the catch is elastically deformed outward so that the hook enters the catch from the side closer to the accommodation portion, an engaging surface of the hook engages with a catch surface of the catch so that the lens and the case are joined to each other and the joining causes the waterproof member to be compressed. The engaging surface and the catch surface are inclined by either an equal angle or a similar angle relative to an imaginary plane perpendicular to an arrangement direction of the case and the lens such that the catch surface is located inward of the engaging surface and closer to the accommodation portion.

According to the above structure, when the waterproof member is compressed by joining the case and the lens with the joining portion, a reactive force acts on the case and the lens. The reactive force causes the case and the lens to be pushed in the separating direction. Accordingly, the hook and the catch act to slide along the engaging surface and the catch surface, which are inclined relative to the imaginary plane. Since the catch surface is located closer to the accommodation portion than the engaging surface and inward of the engaging surface, the catch acts to slide inward, and the hook acts to slide outward. Such sliding directions increase the area of the engaging portion between the engaging surface and the catch surface. Thus, although one of the hook and the catch is formed to be capable of being elastically deformed for engagement of the hook and the catch, the hook resists disengagement from the catch.

DETAILED DESCRIPTION OF THE PREFERRED EMBODIMENT

A waterproof structure for a vehicle lighting device according to one embodiment will now be described with reference to the drawings.

Figure 1:
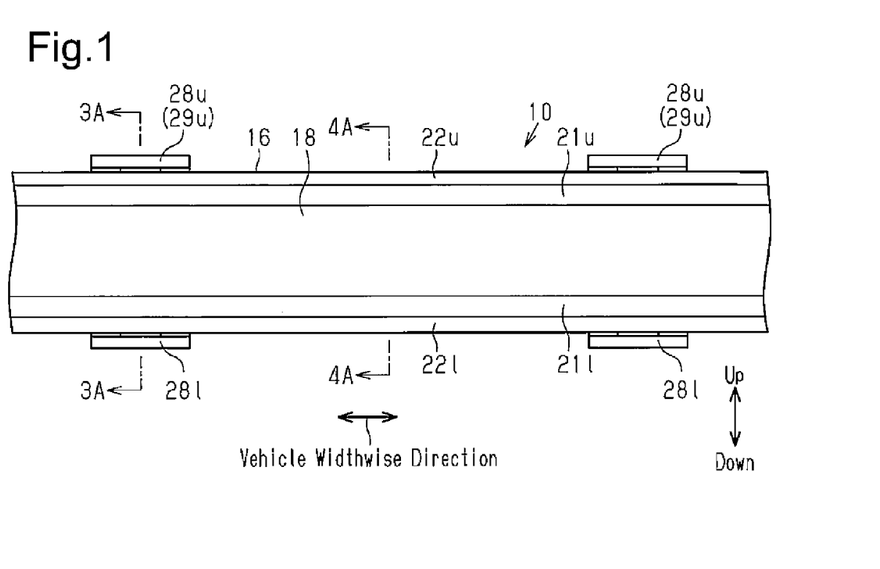
FIG. 1 is a partial front view of a waterproof structure for a vehicle lighting device according to one embodiment.
Figure 3A:
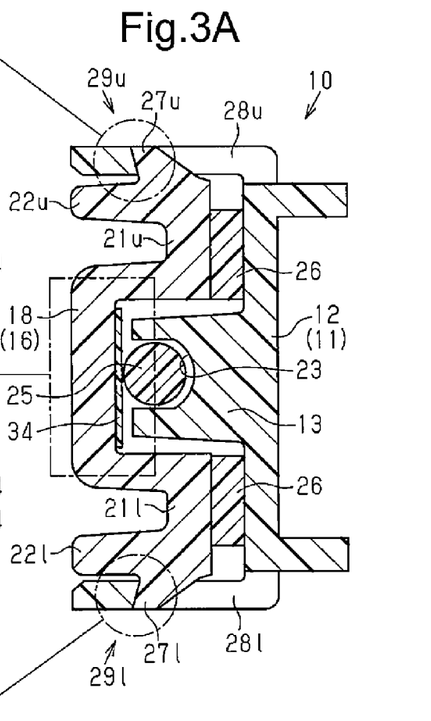
FIG. 3A is a cross-sectional view taken along line 3A-3A of FIG. 1.

FIG. 1 shows a vehicle lighting device 10 for illuminating the outside of a vehicle. The vehicle lighting device 10 is mounted on, for example, an edge of the front grille on the vehicle front surface and is applied to an accessory lamp that linearly illuminates the vicinity of the edge. As shown in FIG. 3A, the vehicle lighting device 10 includes a case 11 that forms the rear part of a shell and a lens 16 that forms the front part of the shell.

Figure 2:
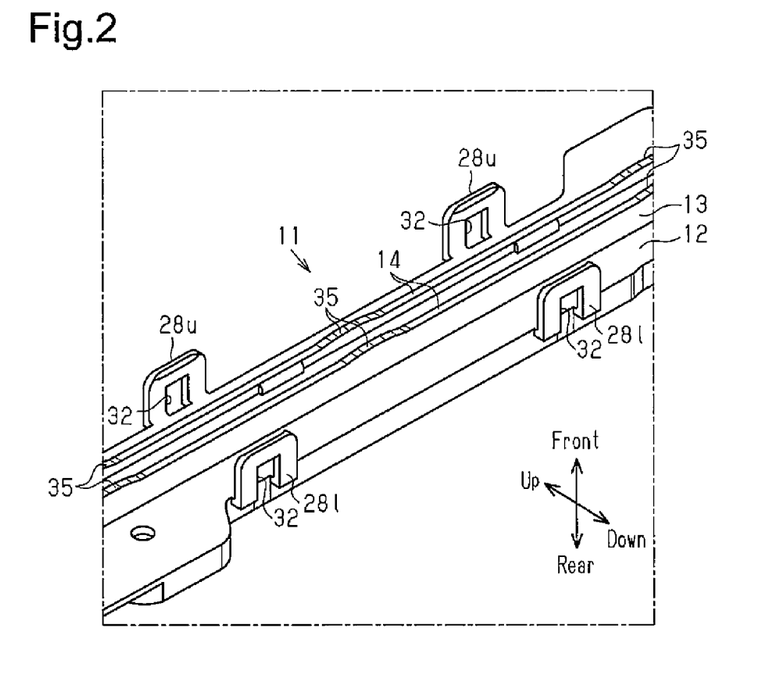
FIG. 2 is a partial perspective view illustrating the case of the vehicle lighting device of FIG. 1.
Figure 3B:
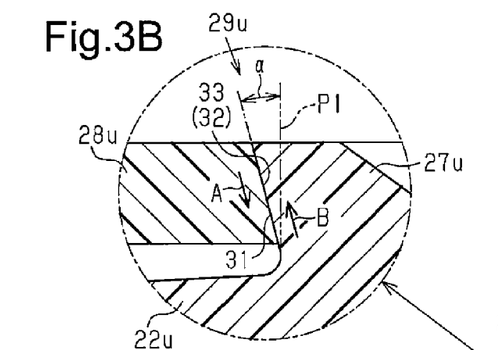
FIGS. 3B, 3C, and 3D are enlarged partial cross-sectional views illustrating parts of FIG. 3A.
Figure 3C:
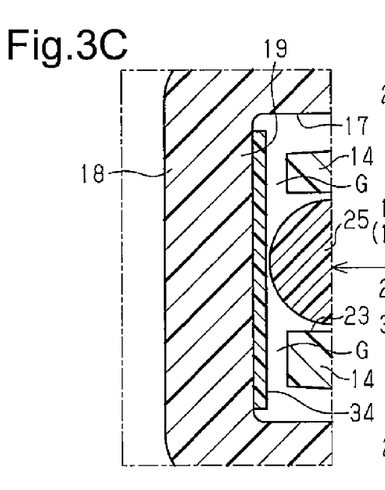

As shown in FIGS. 2, 3A, and 3C, the case 11 is formed of material that resists transmission of light such as polypropylene (PP), which is an opaque plastic. The case 11 includes a base 12 that forms the main portion and a first holding portion 13 that projects forward from the vertical center of the base 12. The base 12 and the first holding portion 13 extend in the vehicle widthwise direction (in a direction perpendicular to the sheet of FIG. 3A) and are elongated. The first holding portion 13 includes a pair of retaining portions 14 at its front portion. The retaining portions 14 project forward in a state vertically separate from each other and facing each other. The retaining portions 14 also extend in the vehicle widthwise direction and are elongated.

As shown in FIGS. 1, 3A, and 3C, the lens 16 is formed of a transparent plastic. The main portion of the lens 16 is formed by a lens main body 18 that includes a recess 17 having an open rear end. The inner bottom of the recess 17 forms a flat second holding portion 19. A vertical wall 21*u* projects upward from the upper rear end of the lens main body 18, and a vertical wall 21*l* projects downward from the lower rear end of the lens main body 18. The vertical walls 21*u*, 21*l* extend outward to separate from an accommodation portion 23, which will be discussed below. A lateral wall 22*u* projects forward from the upper end of the upper vertical wall 21*u*. A lateral wall 22*l* projects forward from the lower end of the lower vertical wall 21*l*. The lens main body 18, the vertical walls 21*u*, 21*l*, and the lateral walls 22*u*, 22*l* extend in the vehicle widthwise direction and are elongated.

The space surrounded by the retaining portions 14 of the first holding portion 13 and the second holding portion 19 form the accommodation portion 23. The accommodation portion 23 accommodates a light emitter, which is a rod-like light guide 25. The light guide 25 is elongated in the vehicle widthwise direction, propagates light from one end surface to the other end surface, and linearly emits light. The light guide 25 includes a light incidence surface (not shown) on one end surface.

The light guide 25 is formed into a rod-like shape with a transparent plastic, or polymethyl methacrylate (PMMA), which is one form of an acrylic plastic, in this embodiment. The cross-sectional shape of the light guide 25 is circular in this embodiment, but may also be rectangular.

The light guide 25 may be formed by multiple members that are coaxially laminated to form a layered structure, or the light guide 25 may be formed by a single member without a layered structure. In the latter case, a member having a reflecting structure formed by reflecting surfaces such as grooves on the outside or a member including light scattering fine particles dispersed on the outside may be employed. Alternatively, a member having a side surface with white printing or a member having a side surface that has been etched or sandblasted may be employed as the light guide 25.

At a position in the vicinity of the incidence surface of the light guide 25, a light source (not shown) formed by, for example, a light emitting diode (LED) is arranged to face the incidence surface.

The light guide 25 is held by the first holding portion 13 and the second holding portion 19 in a state sandwiched by the retaining portions 14 from above and below.

A looped waterproof member (sealing member) 26 is arranged between the case 11 and the lens 16 and outward of the accommodation portion 23 to surround the accommodation portion 23. The waterproof member 26 is formed by, for example, a cushion or a hot melt adhesive and has elasticity. Part of the waterproof member 26 is arranged between the upper vertical wall 21*u* and the base 12 of the case 11 and is arranged above the first holding portion 13. Another part of the waterproof member 26 is arranged between the lower vertical wall 21*l* and the base 12 and is arranged below the first holding portion 13.

Hooks 27*u*, 27*l* that project outward from the lateral walls 22*u*, 22*l* are provided at multiple positions on the lateral walls 22*u*, 22*l* to be spaced apart from each other in the longitudinal direction (vehicle widthwise direction) of the light guide 25. The upper hooks 27*u* project substantially upward from the upper lateral wall 22*u*. The lower hooks 27*l* project substantially downward from the lower lateral wall 22*l*. The hooks 27*u*, 27*l* are located outward of the waterproof member 26. Each of the hooks 27*u*, 27*l* has an engaging surface 31 on its front surface.

As shown in FIGS. 1, 2, and 3A, catches 28*u*, 28*l* are provided on the base 12 at multiple positions spaced apart from each other in the longitudinal direction of the light guide 25, that is, multiple positions corresponding to the hooks 27*u*, 27*l*. The upper catches 28*u* project forward from the upper end of the base 12. The lower catches 28*l* project forward from the lower end of the base 12. The catches 28*u*, 28*l* each include a hole 32 that is substantially rectangular as viewed from the vertical direction and are located outward of the waterproof member 26 like the hooks 27*u*, 27*l*. One of the inner wall surfaces of the hole 32 in each of the catches 28*u*, 28*l* located at the front forms a catch surface 33. Each of the catches 28*u*, 28*l* is capable of being elastically deformed in the vertical direction with its own rear end portion (the boundary relative to the base 12) serving as a fulcrum.

A film 34 located in front of the light guide 25 is arranged on the second holding portion 19 and between the second holding portion 19 and the first holding portion 13. The film 34 permits light that has been output from the light guide 25 to pass through, and the manner in which the light is passed through is varied depending on different sections. A dot pattern is printed on the film 34, and the density and the size of dots vary depending on different sections.

The catches 28*u*, 28*l* are elastically deformed outward so that the hooks 27*u*, 27*l* enter the holes 32 of the catches 28*u*, 28*l* from the side closer to the accommodation portion 23. When the engaging surfaces 31 of the hooks 27*u*, 27*l* are engaged with the corresponding catch surfaces 33 of the catches 28*u*, 28*l*, the case 11 and the lens 16 are joined with each other.

Figure 3D:
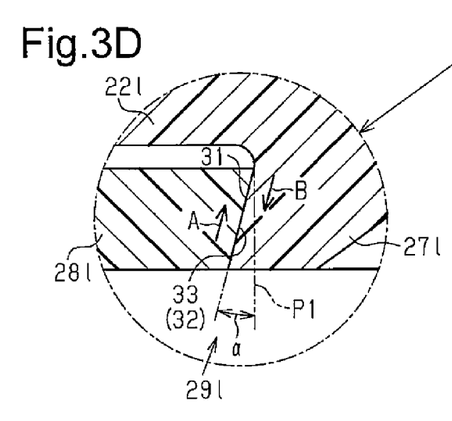

Furthermore, in the present embodiment, as shown in FIGS. 3B and 3D, each engaging surface 31 and the associated catch surface 33 are inclined by an equal angle α relative to an imaginary plane P1 that is perpendicular to an arrangement direction (front and rear direction) of the case 11 and the lens 16 such that the catch surface 33 is located inward of the engaging surface 31. In other words, each engaging surface 31 and the associated catch surface 33 are inclined such that the outer portion is located forward (and the inner portion is located rearward).

As shown in FIGS. 3A and 3C, the retaining portions 14 of the first holding portion 13 are separate from the second holding portion 19 and the film 34 at each position corresponding to a set of upper and lower joining portions 29*u*, 29*l*, at which engaging surfaces 31 engage with the corresponding catch surfaces 33, with respect to the longitudinal direction of the light guide 25.

Figures 4A, 4B:
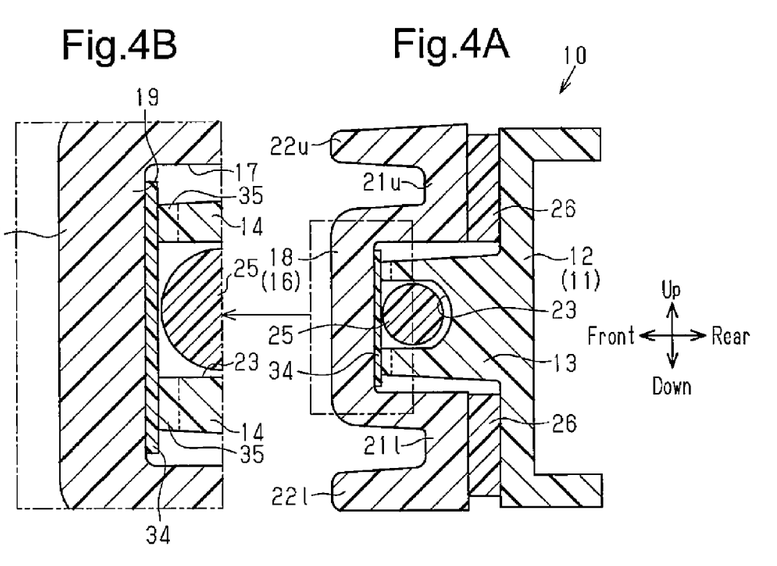
FIG. 4A is a cross-sectional view taken along line 4A-4A of FIG. 1.
FIG. 4B is an enlarged partial cross-sectional view illustrating part of FIG. 4A.

As shown in FIGS. 2, 4A, and 4B, the retaining portions 14 indirectly contact the second holding portion 19 via the film 34 at positions between adjacent sets of the joining portions 29*u*, 29*l* with respect to the longitudinal direction of the light guide 25. In the present embodiment, such contact occurs at the midpoint between each adjacent sets of the joining portions 29*u*, 29*l* with respect to the longitudinal direction of the light guide 25. In the present embodiment, a bulging portion 35 that bulges forward is formed at a position on each of the retaining portions 14 between (at the midpoint between) any adjacent sets of the joining portions 29*u*, 29*l* with respect to the longitudinal direction of the light guide 25. The retaining portions 14 indirectly contact the second holding portion 19 via the film 34 at the distal end of the bulging portions 35. In other words, the second holding portion 19 contacts the film 34 from the front, and the bulging portions 35 of the retaining portions 14 contact the film 34 from the rear.

As described above, the waterproof structure of the vehicle lighting device 10 is formed.

Operation of the present embodiment will be described together with the procedure for joining the lens 16 and the case 11.

Figure 5:
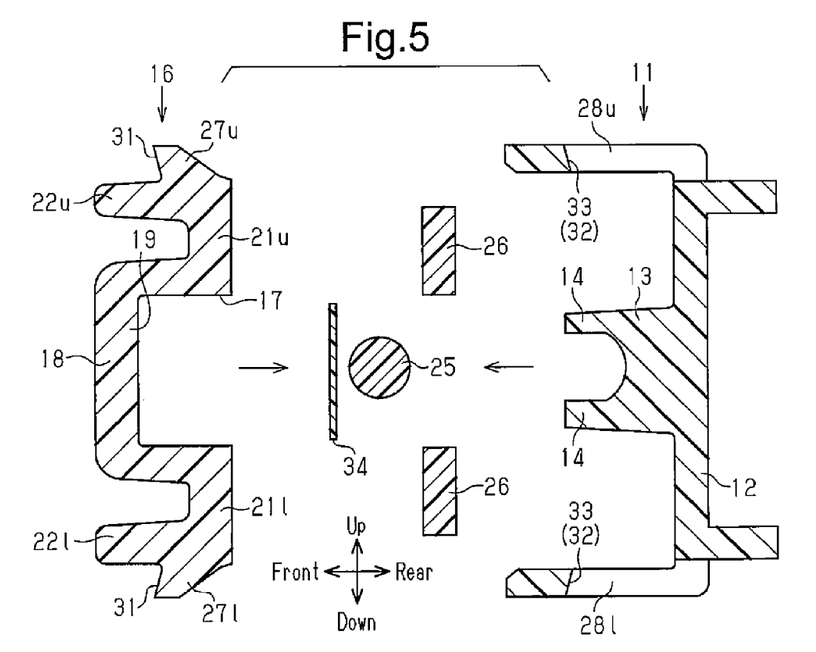
FIG. 5 is an exploded cross-sectional view taken along line 3A-3A of FIG. 1, illustrating components of the vehicle lighting device.
Figure 6:
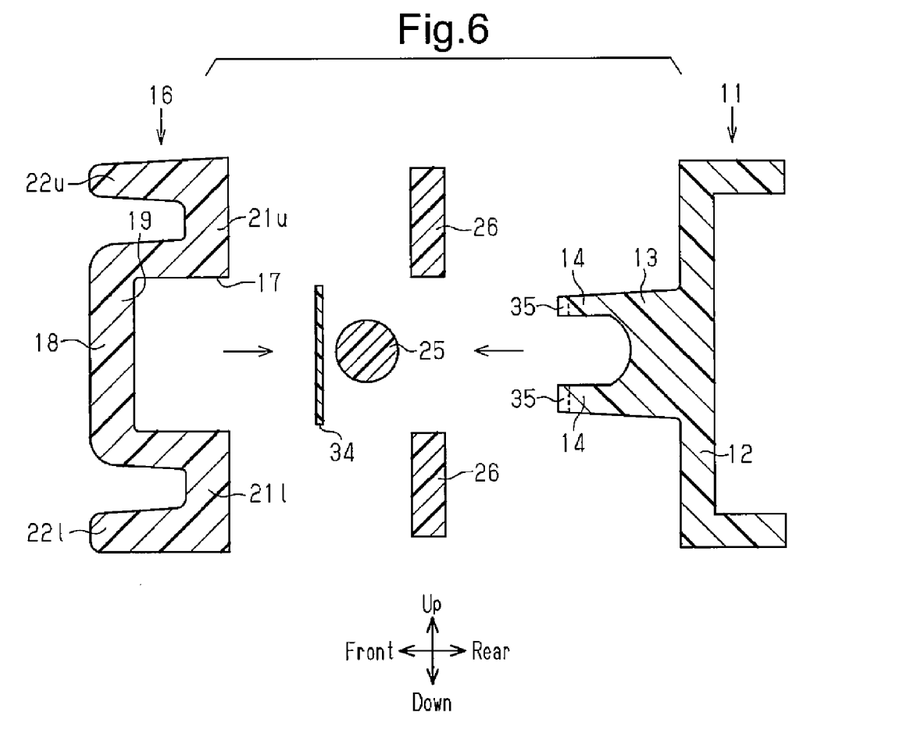
FIG. 6 is an exploded cross-sectional view taken along line 4A-4A of FIG. 1, illustrating components of the vehicle lighting device.

In the joining procedure, as shown in FIGS. 5 and 6, the lens 16 is located in front of and separate from the case 11. The case 11 and the lens 16 are positioned with respect to each other along the length of the light guide 25 such that the hooks 27*u*, 27*l* face the catches 28*u*, 28*l*. The waterproof member 26, the light guide 25, and the film 34 are arranged between the case 11 and the lens 16. In particular, the light guide 25 is arranged between the retaining portions 14 of the first holding portion 13 so that the vertical position of the light guide 25 is determined. In this stage, the second holding portion 19 and the first holding portion 13 are separate from each other at positions corresponding to the sets of the joining portions 29*u*, 29*l* (FIG. 5) and positions between the adjacent sets of the joining portions 29*u*, 29*l* (FIG. 6) with respect to the longitudinal direction of the light guide 25.

Figure 7A:
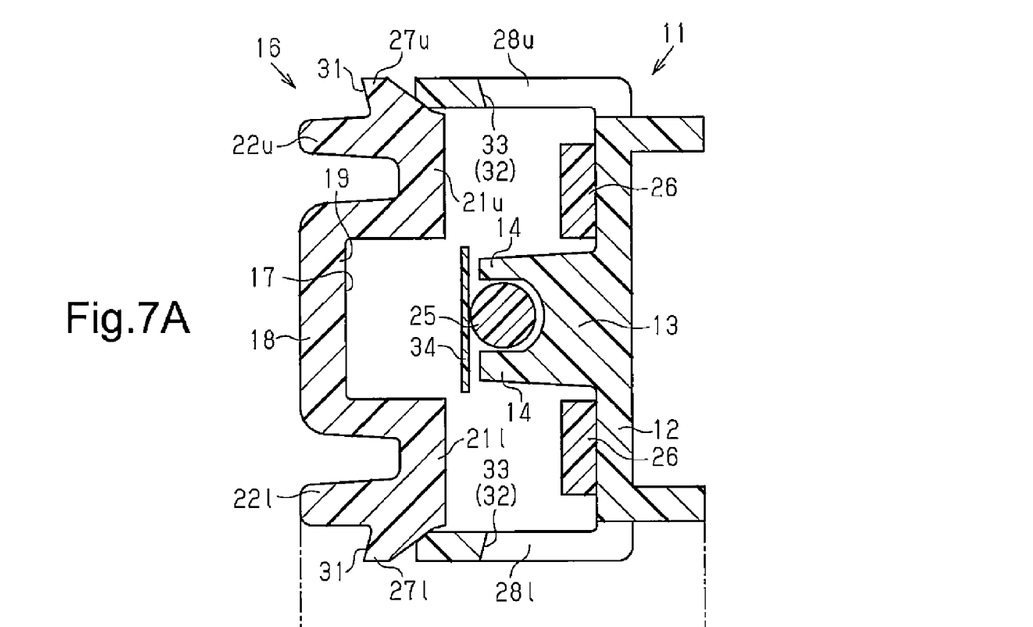
FIG. 7A is a cross-sectional view illustrating an intermediate state of assembling the vehicle lighting device from the state of FIG. 5.
Figure 7B:
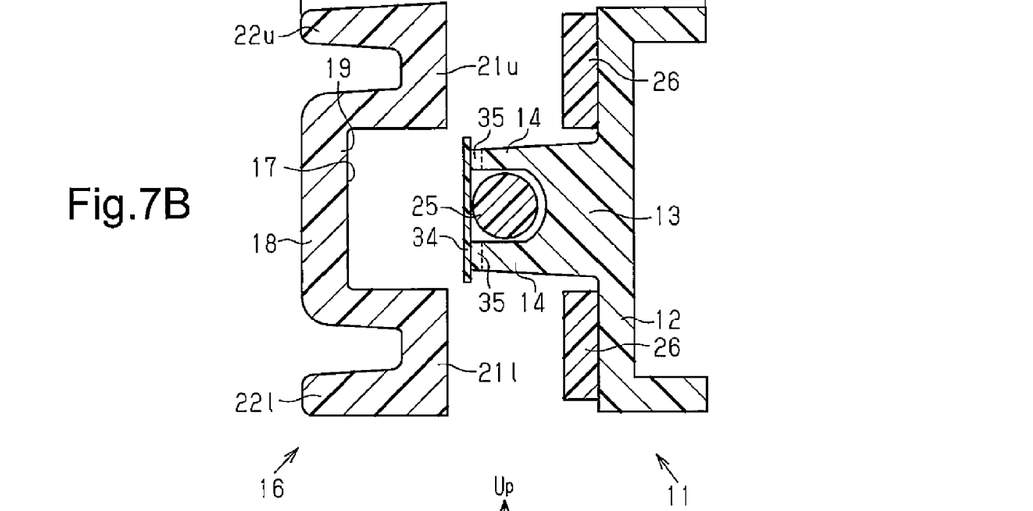
FIG. 7B is a cross-sectional view illustrating an intermediate state of assembling the vehicle lighting device from the state of FIG. 6.

From the above state, at least one of the case 11 and the lens 16 is shifted in a direction to approach the other. When the hooks 27*u*, 27*l* are brought to positions where the hooks 27*u*, 27*l* contact the corresponding catches 28*u*, 28*l* as shown in FIG. 7A, the catches 28*u*, 28*l* restrain the lens 16 (the hooks 27*u*, 27*l*) from being shifted further rearward at positions corresponding to the sets of the joining portions 29*u*, 29*l* with respect to the longitudinal direction of the light guide 25. Although the second holding portion 19 and the first holding portion 13 have approached each other, they are still separate from each other at the positions corresponding to the sets of the joining portions 29*u*, 29*l* (FIG. 7A) and the positions between the adjacent sets of the joining portions 29*u*, 29*l* (FIG. 7B) with respect to the longitudinal direction of the light guide 25.

Figure 8A:
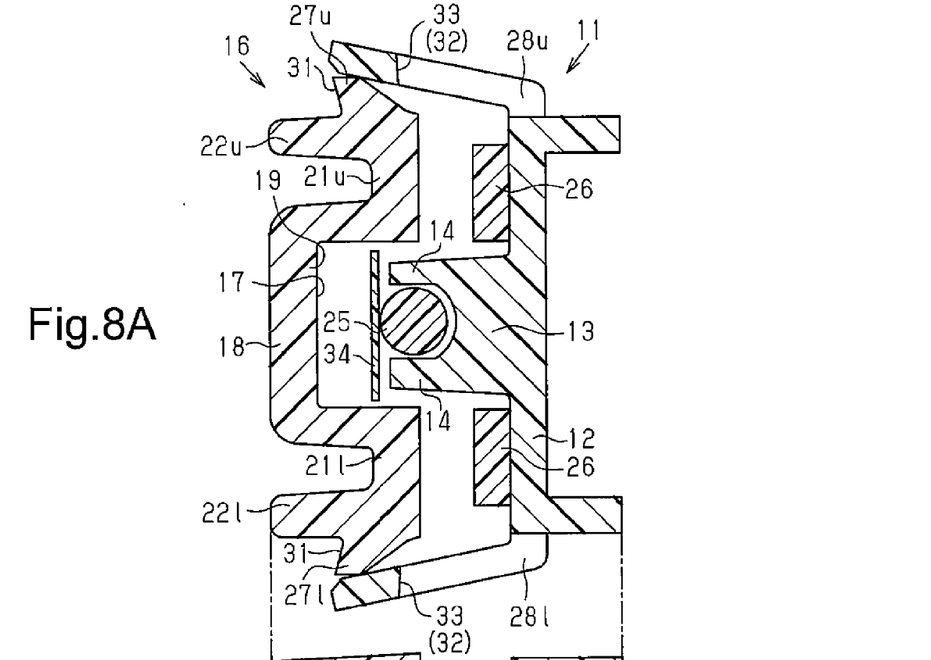
FIG. 8A is a cross-sectional view corresponding to FIG. 7A, illustrating a state in which the case and the lens are brought closer to each other.
Figure 8B:
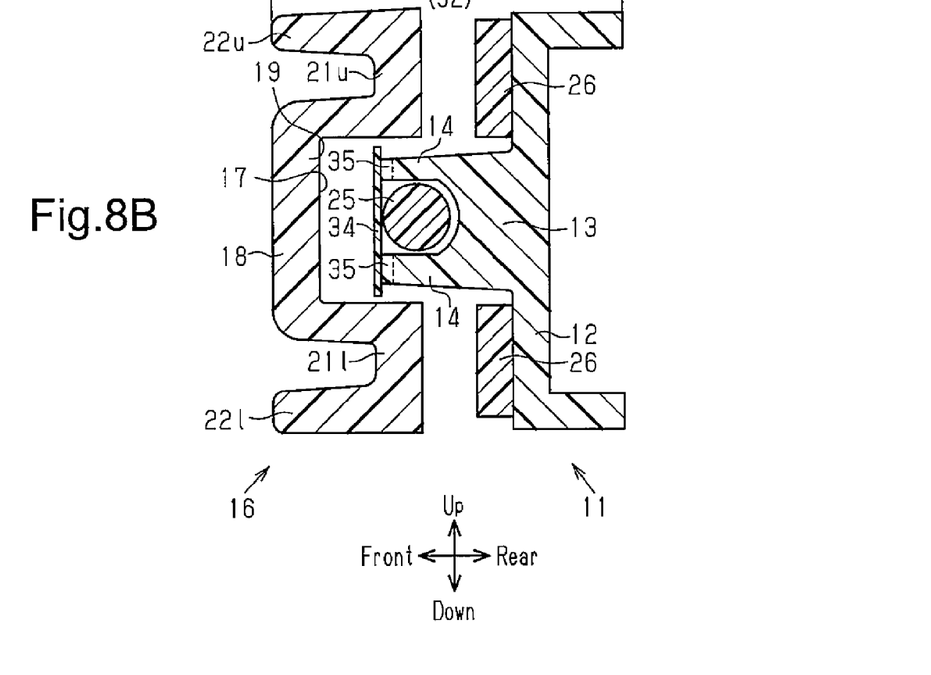
FIG. 8B is a cross-sectional view corresponding to FIG. 7B.

When the case 11 and the lens 16 are further brought closer to each other against the catches 28*u*, 28*l*, each of the catches 28*u*, 28*l* is elastically deformed outward with its rear end (boundary relative to the base 12) serving as a fulcrum at positions corresponding to the sets of the joining portions 29*u*, 29*l* with respect to the longitudinal direction of the light guide 25 as shown in FIG. 8A. As the case 11 and the lens 16 are brought closer as described above, the engaging surfaces 31 of the hooks 27*u*, 27*l* approach the catch surfaces 33 of the catches 28*u*, 28*l*. Also, at the positions corresponding to the sets of the joining portions 29*u*, 29*l* (FIG. 8A) with respect to the longitudinal direction of the light guide 25, and at the positions between the adjacent sets of the joining portions 29*u*, 29*l* (FIG. 8B), the second holding portion 19 and the first holding portion 13 further approach each other, and portions of the retaining portions 14 enter the recess 17.

Figure 9A:
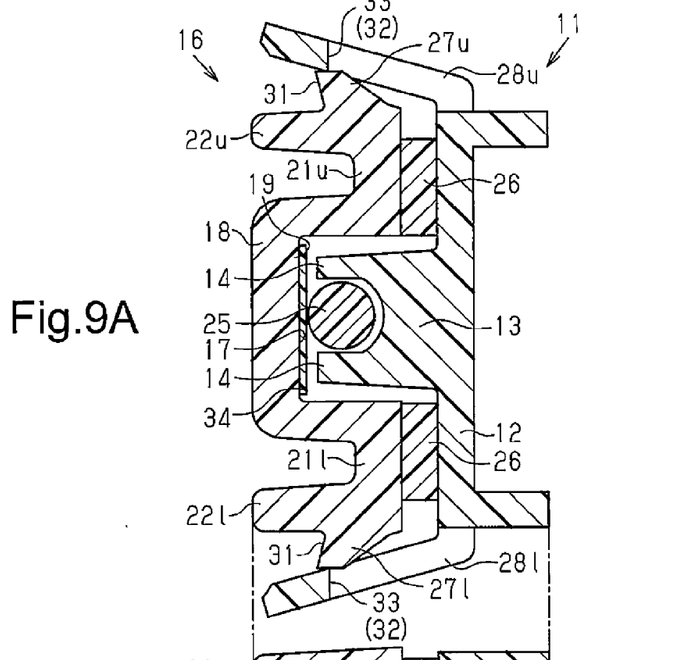
FIG. 9A is a cross-sectional view corresponding to FIG. 8A, illustrating a state in which the case and the lens are brought further closer to each other.

When the case 11 and the lens 16 are further brought closer to each other, the catches 28*u*, 28*l*, which are pushed by the hooks 27*u*, 27*l*, are elastically deformed further outward as compared to the state in FIG. 8A at the positions corresponding to the sets of the joining portions 29*u*, 29*l* with respect to the longitudinal direction of the light guide 25 (FIG. 9A).

Figure 9B:
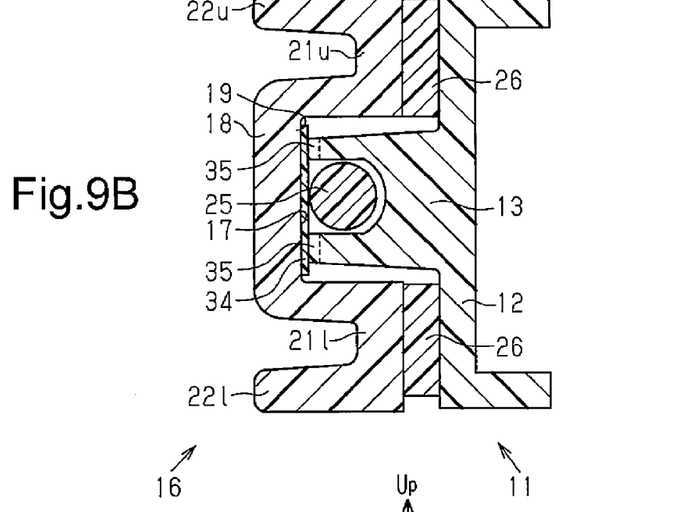
FIG. 9B is a cross-sectional view corresponding to FIG. 8B.

Subsequently, as shown in FIG. 9B, the distal ends of the bulging portions 35, which bulge from the retaining portions 14, indirectly contact the second holding portion 19 via the film 34 at the positions between the adjacent sets of the joining portions 29*u*, 29*l* with respect to the longitudinal direction of the light guide 25.

The light guide 25 is held by the first holding portion 13 and the second holding portion 19 in a state sandwiched between the pair of retaining portions 14 of the first holding portion 13. This favorably limits the movement of the light guide 25.

The hooks 27*u*, 27*l* are located close to the holes 32 of the catches 28*u*, 28*l* at the positions corresponding to the sets of the joining portions 29*u*, 29*l* (FIG. 9A) with respect to the longitudinal direction of the light guide 25. However, the engaging surfaces 31 have not yet been engaged with the catch surfaces 33.

Assume that the engaging surfaces 31 and the catch surfaces 33 are not inclined relative to the imaginary plane P1, that is, the engaging surfaces 31 and the catch surfaces 33 are perpendicular to the arrangement direction of the case 11 and the lens 16 (front and rear direction). In this case, when the second holding portion 19 and the first holding portion 13 indirectly contact each other at the positions between the adjacent sets of the joining portions 29*u*, 29*l* with respect to the longitudinal direction of the light guide 25 and the hooks 27*u*, 27*l* reach the holes 32 of the catches 28*u*, 28*l*, the engaging surfaces 31 will engage with the catch surfaces 33.

Figure 10A:
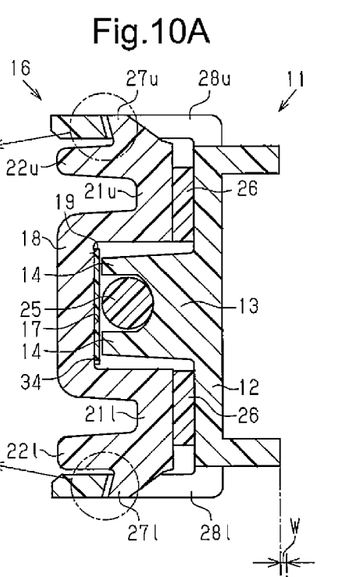
FIG. 10A is a cross-sectional view corresponding to FIG. 9A, illustrating a state in which the case and the lens are brought further closer to each other.
Figure 10B:
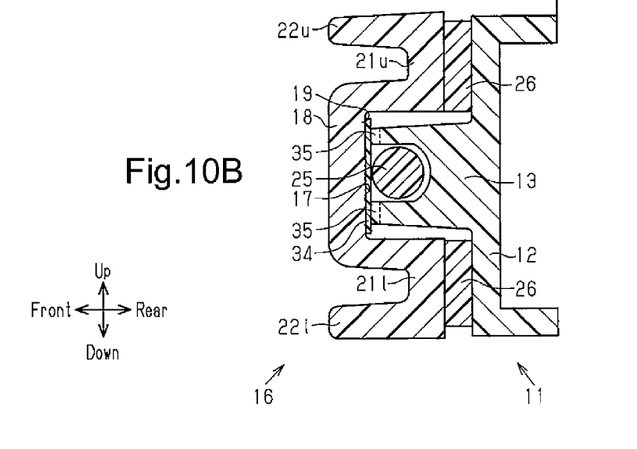
FIG. 10B is a cross-sectional view corresponding to FIG. 9B.
Figure 10C:
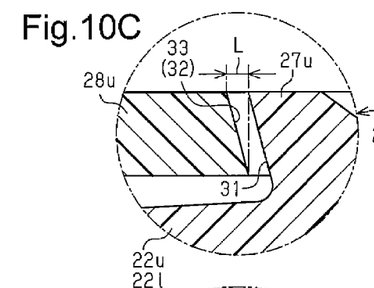
FIGS. 10C and 10D are enlarged partial cross-sectional views illustrating parts of FIG. 10A.
Figure 10D:
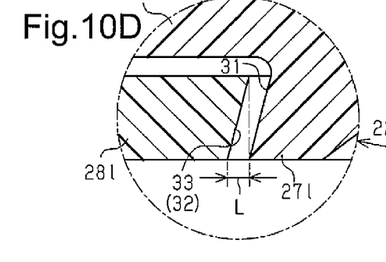

In contrast, to engage the engaging surfaces 31 that are inclined relative to the imaginary plane P1 with the catch surfaces 33 that are also inclined by the equal angle α as in the present embodiment, the case 11 and the lens 16 need to be brought closer to each other until the engaging surfaces 31 are shifted past the catch surfaces 33. That is, unlike the case in which the engaging surfaces 31 and the catch surfaces 33 are not inclined relative to the imaginary plane P1, the case 11 and the lens 16 need to be shifted further in the direction to approach each other. More specifically, as shown in FIGS. 10C and 10D, the case 11 needs to be shifted by the length L of the engaging surfaces 31 and the catch surfaces 33 in the arrangement direction of the case 11 and the lens 16 (front and rear direction). To perform such extra shifting, a gap is required between the case 11 and the lens 16. This gap may become a cause of rattling.

In this respect, in the present embodiment, at the positions corresponding to the sets of the joining portions 29u, 29l with respect to the longitudinal direction of the light guide 25 (FIGS. 3A and 3C), the retaining portions 14 of the first holding portion 13 and the film 34 are separate from each other and a gap G is formed in between. At the positions between the adjacent sets of the joining portions 29u, 29l with respect to the longitudinal direction of the light guide 25 (FIGS. 4A and 4B), the distal ends of the bulging portions 35 that bulge from the retaining portions 14 indirectly contact the second holding portion 19 via the film 34. Thus, as shown in FIGS. 10A, 10C, and 10D, the base 12 of the case 11 is warped in a direction to narrow the gap between the first holding portion 13 and the second holding portion 19, that is, forward to the position where the engaging surfaces 31 are shifted past the catch surfaces 33. In other words, the base 12 is warped forward by a warpage amount W shown in FIGS. 10A and 10B. The warpage causes the catch surfaces 33 of the catches 28u, 28l shift forward. Also, when the base 12 is warped, the waterproof member 26 located between the base 12 and the vertical walls 21u, 21l of the lens 16 is compressed, and the thickness of the waterproof member 26 is reduced.

At this time, since the bulging portions 35 indirectly contact the second holding portion 19 at the positions between the adjacent sets of the joining portions 29u, 29l with respect to the longitudinal direction of the light guide 25 (FIG. 10B), the base 12 is restrained from being shifted forward and thus not warped. At these positions, the waterproof member 26 is scarcely compressed, and the thickness of the waterproof member 26 is scarcely changed.

When the hooks 27u, 27l reach the holes 32 of the catches 28u, 28l, and the engaging surfaces 31 are shifted past the catch surfaces 33, forces of the hooks 27u, 27l that act to elastically deform the catches 28u, 28l outward are eliminated. Thus, the catches 28u, 28l act to return to the shape before the elastic deformation by their own elastic restoring force.

When the case 11 and the lens 16 are no longer brought closer to each other, the force that acts to compress the waterproof member 26 is eliminated. Thus, the waterproof member 26 acts to return to the shape before the elastic deformation by its own elastic restoring force. Accordingly, at the positions corresponding to the sets of the joining portions 29u, 29l with respect to the longitudinal direction of the light guide 25 (FIG. 10A), the thickness of the waterproof member 26, which has been reduced, returns to the original thickness. The case 11 and the lens 16 are then pushed in the separating directions. Thus, at the positions corresponding to the sets of the joining portions 29u, 29l with respect to the longitudinal direction of the light guide 25, the engaging surfaces 31 of the hooks 27u, 27l are engaged with the catch surfaces 33 of the catches 28u, 28l as shown in FIGS. 3A, 3B, and 3D. Also, the retaining portions 14 of the first holding portion 13 and the film 34 separate from each other as shown in FIG. 3C.

In the vehicle lighting device 10 assembled by joining the case 11 and the lens 16 as described above, the waterproof member 26 is compressed by joining the case 11 and the lens 16 at the joining portions 29u, 29l. Thus, a reactive force acts on the case 11 and the lens 16. The reactive force causes the case 11 and the lens 16 to be pushed in the arrangement direction (front and rear direction), which is the separating direction. Accordingly, the hooks 27u, 27l and the catches 28u, 28l act to slide along the engaging surfaces 31 and the catch surfaces 33, which are inclined relative to the imaginary plane P1. Since the catch surfaces 33 are located inward of the engaging surfaces 31 and are inclined such that the outer portion is located forward, the catches 28u, 28l act to slide inward as shown by arrow A in FIGS. 3B and 3D, and the hooks 27u, 27l act to slide outward as shown by arrow B. The sliding directions are directions that increase the area of the engaging portions between the engaging surfaces 31 and the catch surfaces 33. Thus, although the catches 28u, 28l are formed to be capable of being elastically deformed to engage with the hooks 27u, 27l, the hooks 27u, 27l resist disengagement from the catches 28u, 28l.

In a state in which the case 11 and the lens 16 are joined to each other, the engaging surfaces 31 are engaged with the catch surfaces 33 at the joining portions 29u, 29l. At the positions between the adjacent sets of the joining portions 29u, 29l with respect to the longitudinal direction of the light guide 25 (FIGS. 4A and 4B), the first holding portion 13 and the second holding portion 19 indirectly contact each other via the film 34. This restrains the movement of the case 11 and the lens 16 in the arrangement direction.

Also, at the positions between the adjacent sets of the joining portions 29u, 29l with respect to the longitudinal direction of the light guide 25 (FIGS. 4A and 4B), the second holding portion 19 contacts the film 34 from the front, and the bulging portions 35 contact the film 34 from the rear. Thus, the movement of the film 34 in the thickness direction is restrained between the first holding portion 13 and the second holding portion 19.

When the light source is switched on and emits light in the vehicle lighting device 10, some of the light enters the light guide 25 through the incidence surface. The light propagates in the light guide 25 toward the end surface opposite the incidence surface so that the light guide 25 linearly emits light.

At this time, if the light from the light guide 25 is projected on the waterproof member 26 or the hooks 27u, 27l of the lateral walls 22u, 22l, the light is scattered and becomes a stray light, deteriorating the quality of lighting. In this respect, according to the present embodiment, the retaining portions 14 block the light emitted from the light guide 25 toward the waterproof member 26, the vertical walls 21u, 21l, and thus the lateral walls 22u, 22l. This restrains decrease in the quality of lighting due to the stray light.

The light projected forward from the light guide 25 passes through the film 34 and the second holding portion 19 in order and illuminates the surrounding area. The manner in which the light output from the light guide 25 passes through the film 34 can be varied depending on different sections of the film 34.

Also, in the vehicle lighting device 10, the waterproof member 26 arranged between the case 11 and the lens 16 in a compressed state prevents water such as rain from entering the inner space of the waterproof member 26 (including the accommodation portion 23).

The present embodiment as described above achieves the following advantages.

(1) The present embodiment is based on the vehicle lighting device 10 in which the case 11 and the lens 16 are joined by engaging the hooks 27u, 27l with the catches 28u, 28l located outward of the hooks 27u, 27l. The engaging surfaces 31 and the catch surfaces 33 are inclined relative to the imaginary plane P1 perpendicular to the arrangement direction of the case 11 and the lens 16 (front and rear direction) at the equal angle α (FIGS. 3A, 3B, and 3D) such that the catch surfaces 33 of the catches 28u, 28l are located closer to the accommodation portion 23 (inward) than the engaging surfaces 31 of the hooks 27u, 27l.

Thus, although the catches 28u, 28l are formed to be capable of being elastically deformed to engage with the hooks 27u, 27l, the hooks 27u, 27l resist disengagement from the catches 28u, 28l. The advantage is obtained even if an external force is applied to the case 11 and the lens 16 or thermal expansion or warpage occurs in the case 11 and the lens 16 during usage of the vehicle lighting device 10.

(2) At the positions corresponding to the sets of the joining portions 29u, 29l with respect to the longitudinal direction of the light guide 25 where the engaging surfaces 31 engage with the catch surfaces 33 (FIGS. 3A and 3C), the first holding portion 13 and the second holding portion 19 are separate from each other. In contrast, at the positions between the adjacent sets of the joining portions 29u, 29l with respect to the longitudinal direction of the light guide 25 (FIGS. 4A and 4B), the first holding portion 13 and the second holding portion 19 indirectly contact each other.

This restrains the case 11 and the lens 16 from being displaced in the arrangement direction (front and rear direction).

(3) The bulging portions 35, which bulge toward the second holding portion 19, are formed at the positions of the first holding portion 13 between the adjacent sets of the joining portions 29u, 29l with respect to the longitudinal direction of the light guide 25 (FIGS. 4A and 4B). The first holding portion 13 indirectly contacts the second holding portion 19 at the distal ends of the bulging portions 35.

Thus, with such a simple structure, the first holding portion 13 and the second holding portion 19 indirectly contact each other at the positions between the adjacent sets of the joining portions 29u, 29l with respect to the longitudinal direction of the light guide 25 (FIGS. 4A and 4B). Also, the first holding portion 13 and the second holding portion 19 are separated from each other at the positions corresponding to the sets of the joining portions 29u, 29l with respect to the longitudinal direction (FIGS. 3A and 3C).

(4) The first holding portion 13 includes the pair of retaining portions 14. In a state in which the light guide 25 is sandwiched between the retaining portions 14, the light guide 25 is held between the first holding portion 13 and the second holding portion 19 (FIGS. 4A and 4B).

This favorably restrains the rod-like light guide 25 from being moved.

(5) The film 34, which permits the light output from the light guide 25 to pass through and varies the manner in which the light passes depending on different sections, is arranged between the retaining portions 14 of the first holding portion 13 and the second holding portion 19 (FIGS. 4A and 4B).

Thus, the illuminating manner of the vehicle lighting device 10, such as the brightness and the color, is varied depending on different sections of the vehicle lighting device 10 with a simple structure of adding the film 34.

(6) The first holding portion 13 and the second holding portion 19 contact the film 34 at the positions between the adjacent sets of the joining portions 29u, 29l (FIGS. 4A and 4B) with respect to the longitudinal direction of the light guide 25.

This restrains the film 34 from being displaced between the first holding portion 13 and the second holding portion 19.

The above-described embodiment may be modified as follows.

<Regarding Retaining Portions 14>

The retaining portions 14, which have the bulging portions 35, may be provided on the second holding portion 19 instead of the first holding portion 13.

<Regarding Second Holding Portion 19 of Lens>

The second holding portion 19 may be formed to project from the inner bottom of the recess 17 toward the first holding portion 13.

<Regarding Waterproof Member 26>

The elastic waterproof member 26 may be located at any position between the case 11 and the lens 16 and outward of the accommodation portion 23 that is different from the position in the above described embodiment.

<Regarding Hooks 27u, 27l and Catches 28u, 28l>

The hooks 27u, 27l may be provided on the case 11 instead of the lens 16. In this case, the catches 28u, 28l are provided on the lens 16 instead of the case 11.

During engagement of the hooks 27u, 27l with the catches 28u, 28l, the hooks 27u, 27l may be elastically deformed outward instead of the catches 28u, 28l.

<Regarding Engaging Surfaces 31 and Catch Surfaces 33>

The angles α, by which the engaging surfaces 31 and the catch surfaces 33 are inclined relative to the imaginary plane P1, do not necessarily have to be the same, but may be similar to each other. In this case also, the hooks 27u, 27l and the catches 28u, 28l can slide along the engaging surfaces 31 and the catch surfaces 33.

<Regarding Light Emitter>

The light emitter may have a shape different from the rod-like light guide 25.

<Regarding Film 34>

The film 34 may be omitted. In this case, the first holding portion 13 and the second holding portion 19 directly contact each other at the positions between the adjacent sets of the joining portions 29u, 29l with respect to the longitudinal direction of the light guide 25.

<Regarding Bulging Portions 35>

The bulging portions 35 may be formed at positions displaced from the center on condition that they are located between the adjacent sets of the joining portions 29u, 29l with respect to the longitudinal direction of the light guide 25.

<Regarding Applicability>

The vehicle lighting device 10 may be mounted on a position different from that in the above-described embodiment on condition that it is located on the exterior of the vehicle. The position includes the rear surface and the side surfaces of the vehicle. In this case, the case 11 and the lens 16 may be arranged in a direction different from the front and rear direction.

The invention claimed is:

1. A waterproof structure for a vehicle lighting device, comprising:
 a case and a lens forming a shell;
 an accommodation portion surrounded by the case and the lens;
 a light emitter arranged in the accommodation portion;
 an elastic waterproof member located between the case and the lens and at a position outward of and separate from the accommodation portion;
 a hook that is provided on one of the case and the lens and located outward of the waterproof member; and
 a catch that is provided on the other one of the case and the lens and located outward of the waterproof member, wherein one of the hook and the catch is elastically deformed outward so that the hook enters the catch from the side closer to the accommodation portion, an engaging surface of the hook engages with a catch surface of the catch so that the lens and the case are joined to each other and the joining causes the waterproof member to be compressed, and the engaging surface and the catch surface are inclined by either an equal angle or a similar angle relative to an imaginary plane perpendicular to an arrangement direction of the case and the lens such that the catch surface is located inward of the engaging surface and closer to the accommodation portion, wherein the light emitter is formed by a rod-like light guide that propagates light and linearly emits light, the hook and the catch form a joining portion, and the joining portion is one of a plurality of joining portions located at a plurality of positions separate from each other in a longitudinal direction of the light guide, the light guide is held by a first holding portion provided on the case and a second holding portion provided on the lens, the first holding portion and the second holding portion are separate from each other at positions corresponding to the joining portions, at which the engaging surfaces engage with the catch surfaces, with respect to the longitudinal direction of the light guide, and the first holding portion and the second holding portion either directly or indirectly contact each other at a position between two of the joining portions that are adjacent to each other with respect to the longitudinal direction of the light guide, wherein one of the first holding portion and the second holding portion includes a pair of retaining portions, and the light guide is held between the first holding portion and the second holding portion in a state in which the light guide is sandwiched by the retaining portions, and wherein the waterproof structure further comprises a film located between the first holding portion and the second holding portion, wherein the film permits light output from the light guide sandwiched by the retaining portions to pass through and varies the manner in which the light passes depending on different sections.

2. The waterproof member for a vehicle lighting device according to claim 1, wherein one of the first holding portion and the second holding portion includes a bulging portion that bulges toward and either directly or indirectly contacts the other one of the first holding portion and the second holding portion at a position between the two joining portions, which are adjacent to each other with respect to the longitudinal direction of the light guide.

3. The waterproof structure for a vehicle lighting device according to claim 1, wherein the first holding portion and the second holding portion both contact the film at a position between the two adjacent joining portions, which are adjacent to each other with respect to the longitudinal direction of the light guide.

* * * * *